Jan. 30, 1923.
P. W. DAVIS ET AL.
HARVESTING MACHINE.
FILED NOV. 15, 1920.
1,443,872
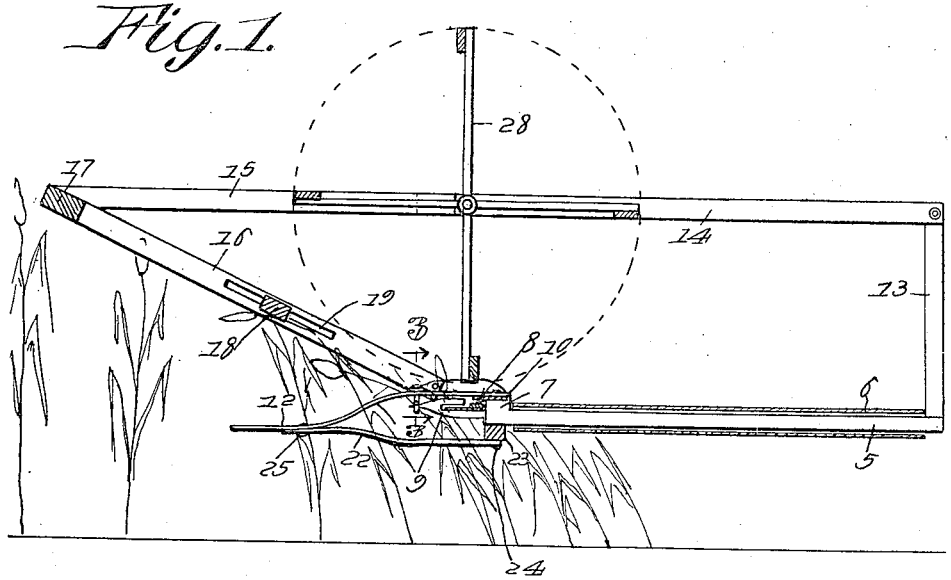
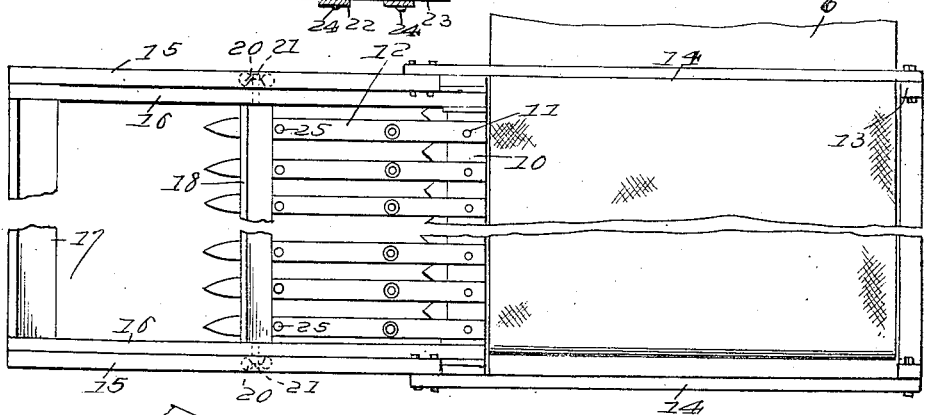
Inventors,
Paul W. Davis & Dona M. Davis.
By Hawks. Annumay
Attorney Patented Jan. 30, 1923.

1,443,872

UNITED STATES PATENT OFFICE.

PAUL W. DAVIS AND DONA M. DAVIS, OF HOOKER, OKLAHOMA.

HARVESTING MACHINE.

Application filed November 15, 1920. Serial No. 424,157.

*To all whom it may concern:*

Be it known that we, PAUL W. DAVIS and DONA M. DAVIS, citizens of the United States of America, and residents of Hooker, in the county of Texas and State of Oklahoma, have invented certain new and useful Improvements in Harvesting Machines, of which the following is a specification.

This invention relates to attachments for harvesters and particularly to that type of harvesters known as headers.

The invention has for its object the provision of novel means constituting an attachment for headers now in common use, although, of course, the invention is susceptible of being made as the original device having means for accomplishing the results hereinafter stated.

It is an object of this invention to provide novel means whereby the heads of grain may be cut from the stalk at points close to the heads so that there will be no undue amount of stalk handled in gathering the grain; and the said invention is designed primarily for use in the harvesting of milo maize which has a relatively large head as compared with most other grain harvested.

An object of this invention is to provide novel means for delivering the stalk to the cutter in such a manner as to insure the separation of the head from the stalk with the minimum of stalk, and to that end, provision is made for bending the stalks until the heads encounter the guides and are directed to the cutter; the said invention having novel means whereby stalks of different heights may be treated or bent to produce the result stated.

A still further object of this invention is to provide novel means whereby the device embodying the invention may be applied to headers or harvesters now in common use, thus making it readily transformed from a header of wheat or grain with small heads, to a machine capable of harvesting the milo maize.

A still further object of this invention is to produce a device having a guiding element with means for permitting its adjustment to suit the condition of the crop to be harvested as to height in order that the guiding element will come in contact with the stalks in proper positions or relations to the heads to effect the results intended.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a sectional view of a fragment of a conveyor table and finger bar with a device embodying the invention applied thereto;

Figure 2 illustrates a top plan view thereof;

Figure 3 illustrates a sectional view on the line 3—3 of Fig. 1; and

Figure 4 illustrates a perspective view of a fragment of the stalk bending bar.

In these drawings 5 denotes a grain table of a header having the usual conveyer 6 which is here conventionally shown and a sill 7 constituting a support for the finger bar or cutting mechanism 8, which may be of any appropriate type but preferably having fingers such as 9.

The parts just described may, as stated, be of any ordinary type, and the inventors do not wish to be limited with respect to these well known parts of harvesting machines.

The attachment comprising the invention includes a plate 10 having a series of apertures for the reception of fastenings 11 which may be in the nature of bolts or screws, which fastenings are also utilized for the purpose of anchoring the rear ends of the guiding auxiliary fingers 12 which project forwardly and are in spaced relation to each other so that the clearance therebetween may be occupied by the stalks as the harvester is advanced.

Suitable members 13 and 14 of the ordinary reel frame may be provided on each side of the table and they, in this embodiment of the invention, constitute supports for the rails 15 having their forward ends projecting well outwardly beyond the auxiliary fingers. Braces 16 have their inner ends supported by the usual dividing boards and the braces extend upwardly and outwardly to the ends of the rails where they are connected to the rails and with the said rails they form a frame-like structure for supporting the bars or grain guiding elements 17 and 18 which are intended to engage the stalks of the vegetation to bend or incline it in order that it will be approached by the cutter when in its bent state. The bar 18 is preferably adjustable longitudinally of the braces, and to that end, each brace may be provided with a slot 19 in which a clamping screw 20 is slidable. The said screws have nuts 21 on their outer ends which will bear against the braces to hold the said bar 18 in the different positions of adjustment which adjustment changes the height of the bar with relation to the auxiliary fingers, and the adjustment is effected to suit particular conditions of the grain being harvested.

The sill has braces 22 connected to it through the medium of the filler block 23, the said filler block and braces being anchored by fastenings 24 such as bolts or screws, and the outer ends of these braces underlie the auxiliary fingers and are attached to them by fastenings 25 such as rivets or the like. By this means, rigidity is given the auxiliary fingers so that they will withstand pressure due to the crowding of the stalks into the spaces between the auxiliary fingers.

As a further means for holding the auxiliary fingers in position, we produce anchoring means consisting of eye bolts 26, the eyes of which receive the ends of the fingers 9 and the shanks of which project through the auxiliary fingers and are engaged by the nuts 27 in order that lateral movement of the auxiliary fingers is obviated by reason of the fastenings just described and the resistance afforded by the other fastenings of the auxiliary fingers and braces.

The usual reel 28 which is a part of header constructions is, of course, present and will be used to move the heads to the table or conveyer.

We claim:

1. In a harvesting machine, a finger bar, auxiliary fingers extending forwardly of the finger bar, means for attaching the auxiliary fingers in spaced relation to each other on the finger bar, supports extending upwardly and forwardly at each end of the finger bar, and a grain guiding element adjustably secured on said supports.

2. In a header, a finger bar, auxiliary fingers attached thereto and extending forwardly therefrom, braces having their inner ends anchored under the finger bar and having their forward ends connected to the auxiliary fingers for bracing the said auxiliary fingers, supports extending upwardly and forwardly of the finger bar, stalk engaging members carried thereby, and members connecting the said auxiliary fingers to the fingers of the finger bar.

3. In a harvester, a finger bar, supports extending forwardly and upwardly therefrom, stalk engaging elements carried thereby, auxiliary fingers having their rear ends anchored to the finger bar in spaced relation to each other, the said auxiliary fingers extending forwardly, braces for the said auxiliary fingers, eye bolts having shanks extending through the auxiliary fingers and anchored thereto, the said eyes having the ends of the fingers of the finger bar projecting therein for bracing the structure.

4. In a harvesting machine, a finger bar, auxiliary fingers extending forwardly of the finger bar, means for attaching the auxiliary fingers in spaced relation to each other in the finger bar, supports extending upwardly and forwardly from approximately the plane of the finger bar at each end of the finger bar, the said supports having slots therein, and a grain guiding element having connection with the said supports through the said slots and adapted to be secured at different positions in said slots.

PAUL W. DAVIS.
Mrs. DONA M. DAVIS.